April 26, 1932.　　　　K. C. BUGG　　　　1,855,440

BEARING

Filed March 15, 1930

Inventor.
Kenly C. Bugg,
by Rippey & Kingsland.
His Attorneys.

Patented Apr. 26, 1932

1,855,440

UNITED STATES PATENT OFFICE

KENLY C. BUGG, OF ST. LOUIS, MISSOURI

BEARING

Application filed March 15, 1930. Serial No. 436,016.

This invention relates to journal bearings; and an object is to provide an improved journal bearing differing from the ordinary journal bearing in the important particular that this journal bearing possesses an extremely low coefficient of expansion and contraction under variations of temperature, is non-metallic, and is subject to less frictional resistance than the usual metallic journal bearings and requires no lubrication in a large number of uses to which the invention is applied.

Other objects will appear from the following description, reference being made to the accompanying drawings, in which—

Figure 1:
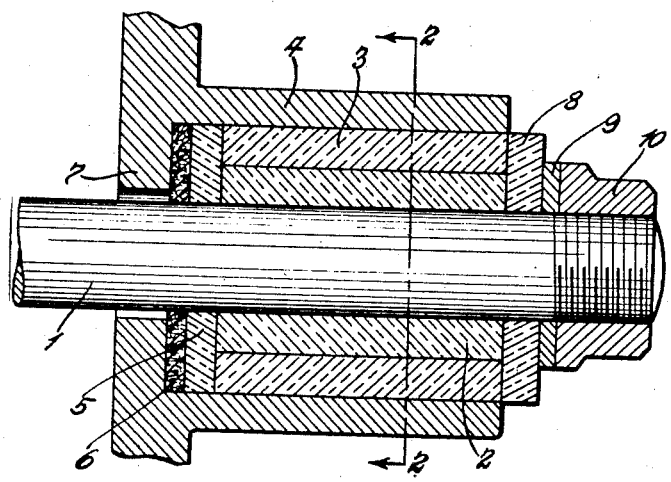
Fig. 1 is a longitudinal sectional view of a bearing constructed in accordance with the present invention.
Figure 2:
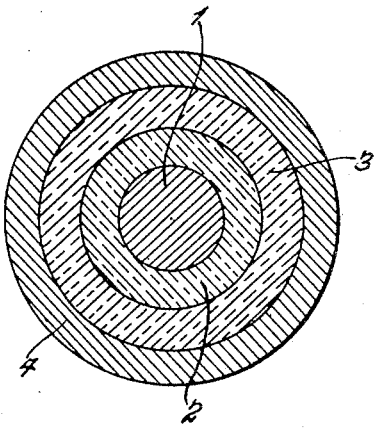
Fig. 2 is a cross-sectional view on the line 2—2 of Fig. 1.

In the device shown in Figs. 1 and 2, the rotary shaft 1 has attached thereto a glass sleeve 2 having a smoothly ground outer periphery. The sleeve 2 is rotative within a glass bushing 3 having a smoothly ground inner periphery in close contact with the outer periphery of the sleeve 2. The sleeve 2 rotates within the bushing 3. These members, being of glass or analogous material, are characterized by an extremely low coefficient of expansion and contraction under variations of temperature and do not become heated in ordinary use when in operation. These members 2 and 3 may be relatively rotated, or one may be rotated with respect to the other at greater speed and for a longer time than metallic members can be rotated one against the other without becoming heated or requiring lubricant. Glass suitable for this purpose is available and possesses sufficient strength and endurance for a large variety of uses.

In this embodiment of the invention, the bushing 3 is mounted in a bearing support 4. Against the inner end of the sleeve 2 and bushing 3, a glass washer 5 is held by a packing 6 seated against the wall 7. A similar washer 8 is held against the outer ends of the sleeve 2 and bushing 3 by a packing washer 9 and nut 10. The washers 5 and 8 are characterized by an extremely low coefficient of expansion and contraction under variations of temperature and have ground surfaces abutting the ground ends of the sleeve 2 and bushing 3.

Figure 3:
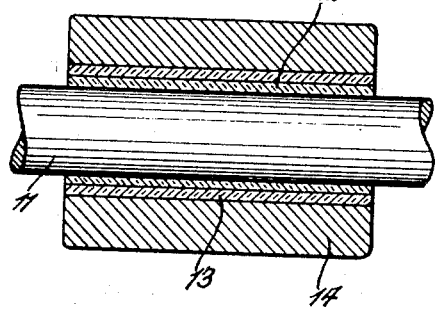
Fig. 3 is a longitudinal sectional view of another form of bearing.

In the form of the invention shown in Fig. 3, the metallic shaft 11 has thereon a glass sleeve 12 rotative in a glass bushing 13 rigid in the metallic bearing support 14. The sleeve 12 and bushing 13 have their contacting surfaces smoothly ground so as to dispense with the requirement for lubricant, and to provide surfaces which will not become heated when one is rotated in or about the other.

Figure 4:
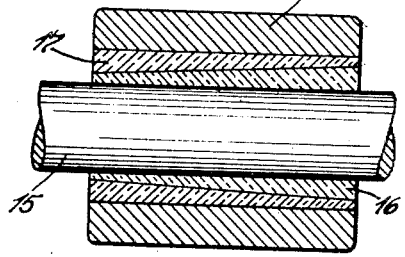
Fig. 4 is a longitudinal sectional view showing two tapered bearing elements telescoped one within the other.

In the device shown in Fig. 4, the metallic shaft 15 has attached thereto a tapered glass sleeve 16 having a smoothly ground periphery and telescoping within an internally tapered glass bushing 17 having its inner surface smoothly ground. The bushing 17 is mounted in a bearing support 18. These parts 16 and 17, being of glass, have an extremely low coefficient of expansion and contraction under variations of temperature and do not require lubricant, nor do they become heated in ordinary use.

Figure 5:
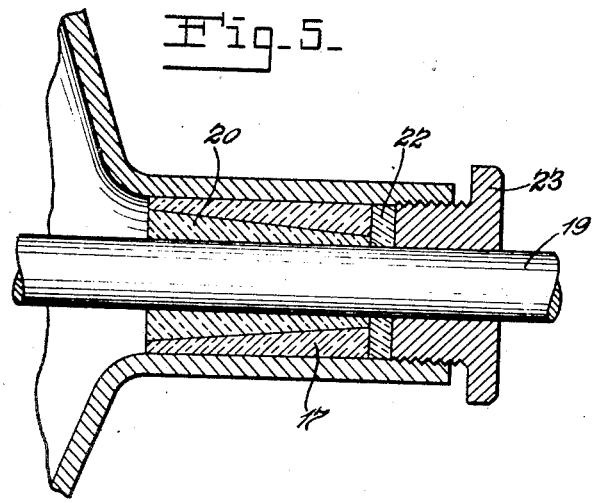
Fig. 5 is a longitudinal sectional view of a bearing comprising two telescoping tapered members and an abutment therefor.

In the device shown in Fig. 5, the metallic shaft 19 has attached thereto a tapered sleeve 20 having a smoothly ground outer periphery operating against the smoothly ground inner periphery of a glass bushing 21 that is telescoped on the sleeve 20. A glass ring 22 is pressed against the outer ends of the parts 20 and 21 by a gland 23, and has its inner surface smoothly ground and abutting against the smoothly ground ends of said parts 20 and 21. These parts 20, 21 and 22, being of glass, are characterized by an extremely low coefficient of expansion and contraction under variations of temperature, and do not become heated when operated without lubricant under the same condition that metal becomes heated and inoperative when used without lubricant.

Figure 6:
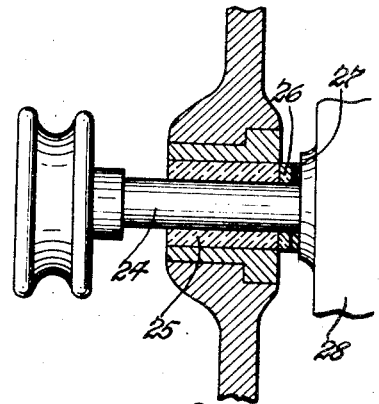
Fig. 6 is a sectional view of another form of the invention.

In the construction shown in Fig. 6, the metallic shaft 24 is journalled for rotation in a glass bushing 25 having a smoothly ground inner periphery engaging the smoothly ground periphery of the shaft 24. A glass disc 26 is pressed against the end of the bushing 25 by a packing 27 abutting the machine part 28 attached to the shaft 24. The parts 25 and 26, being of glass and having abutting smoothly ground surfaces, are characterized by an extremely low coefficient of expansion and contraction under variations of temperature and do not require lubricant nor become heated under the same conditions and uses in which metallic members become heated without lubricant.

The invention may be varied in other particulars than as specifically shown and described, and I contemplate such variations and applications of the invention as may be found suitable.

What I claim and desire to secure by Letters Patent is:

1. The combination with a metallic rotary shaft, of a glass sleeve attached to said shaft and having a smoothly ground periphery and being characterized by an extremely low coefficient of expansion and contraction under variations of temperature, and a glass bushing in which said sleeve is mounted for rotation, said bushing fitting closely about said sleeve and having a smoothly ground inner periphery.

2. The combination with a metallic rotary shaft, of a glass sleeve attached to said shaft and having a smoothly ground periphery and being characterized by an extremely low coefficient of expansion and contraction under variations of temperature, a glass bushing in which said sleeve is mounted for rotation, said bushing fitting closely about said sleeve and having a smoothly ground inner periphery, and a glass washer held in abutting contact with the inner and outer ends respectively of said sleeve and said bushing.

KENLY C. BUGG.